United States Patent [19]

Bengtsson

[11] Patent Number: 4,675,948
[45] Date of Patent: Jun. 30, 1987

[54] CORD LOCKING DEVICE

[75] Inventor: Sigurd W. Bengtsson, Gothenburg, Sweden

[73] Assignee: AB Fixfabriken, Gothenburg, Sweden

[21] Appl. No.: 815,782

[22] Filed: Jan. 3, 1986

Related U.S. Application Data

[63] Continuation of Ser. No. 562,090, Dec. 16, 1983, abandoned.

[30] Foreign Application Priority Data

Dec. 16, 1982 [SE] Sweden ............................... 8207192

[51] Int. Cl.[4] .............................................. F16G 11/00
[52] U.S. Cl. ................................. 24/115 G; 24/136 R
[58] Field of Search ................... 24/523, 115G, 115 H, 24/136 R, 522; 403/138, 166, 326; 339/254 R, 254 M; 188/65.1; 267/61 R, 158, 170, 179; 49/419

[56] References Cited

U.S. PATENT DOCUMENTS

| 137,810 | 4/1873 | Wishart ........................ 339/254 R |
| 1,239,745 | 9/1917 | Timerman ..................... 267/61 R |
| 2,012,770 | 8/1935 | Quintavalle .................. 339/254 R |
| 2,293,719 | 8/1942 | Eby ............................. 339/254 R X |
| 3,080,867 | 3/1963 | Eichinger ..................... 24/115 G X |
| 3,081,992 | 3/1963 | Kessler ........................ 267/179 |
| 3,861,003 | 1/1975 | Boden . |
| 4,034,510 | 7/1977 | Huelsekopf .................... 49/419 |
| 4,288,891 | 9/1981 | Boden .......................... 24/115 G |
| 4,328,605 | 5/1982 | Hutchison et al. ............ 24/115 G |
| 4,453,292 | 6/1984 | Bakker ......................... 24/115 G |
| 4,454,687 | 6/1984 | Baker ........................... 49/419 |

FOREIGN PATENT DOCUMENTS

| 1087204 | 8/1960 | Fed. Rep. of Germany ... 339/254 R |
| 1017239 | 12/1952 | France ......................... 339/254 R |
| 1465690 | 1/1967 | France . |
| 585840 | 3/1977 | Switzerland . |
| 2066891 | 7/1981 | United Kingdom ............ 24/136 R |

Primary Examiner—Kenneth J. Dorner
Assistant Examiner—James R. Brittain
Attorney, Agent, or Firm—Hill, Van Santen, Steadman & Simpson

[57] ABSTRACT

A simple cord locking device which may also be used for ribbons comprising a sleeve and a slide moveable therein. The latter is manufactured from a rigid plastic material and comprises a head, a body, in which an opening and at least a groove are formed, and a spring formed integral with the body. Within a prismatic outer contour the spring is formed as a web of material extending in zig-zag. The sleeve is formed as a planar box, open at one short side thereof and having openings formed in the long sides thereof.

1 Claim, 6 Drawing Figures

4,675,948

CORD LOCKING DEVICE

This is a continuation of application Ser. No. 562,090, filed Dec. 16, 1983, now abandoned.

BACKGROUND OF THE INVENTION (a) Field of the Invention

The invention relates to an adjustable locking clasp.

(b) Prior Art

There are several occasions where it is of importance to retain a body on a cord or a ribbon. It may be necessary to fix the body onto the cord, but it may also be a question of locking two cord or ribbon ends relative each other, for instance after tightening the ends.

There are different types of such cord locking devices that are suitable for different fields of use and types of cords or ribbons, respectively. One lock type comprises a spring loaded slide while other locks include a latching body which is brought into wedging engagement within a conical passage for the cord.

SUMMARY OF THE INVENTION

The present invention relates to a locking device of the first mentioned type, more precisely a locking device comprising a sleeve and a moveable, spring loaded slide where the sleeve as well as the slide have openings formed therein for a cord passing through the locking device. The term cord is used for the sake of simplicity in the specification and claims and the meaning thereof is cords as well as ribbons regardless one or two strands are inserted through the locking device.

An object of the invention is to provide a simple and reliable locking device, where from a manufacturing point of view and from a user point of view it is essential that two parts only are required.

A locking device according to the present invention comprises a sleeve formed as a box having a four-sided, preferably rectangular cross section and open at one short side thereof and of considerably larger depth than the width of the cross section. The slide has a form corresponding to the internal dimension of the box and is manufactured from a plastic material integral with the spring that provides the biasing.

Suitably, the slide is provided with a head having a larger plane dimension than the internal dimension of the sleeve section, and the spring is dimensioned relative to the depth of the sleeve such that it is not completely compressed when the head contacts the sleeve. Within a prismatic outer contour the spring preferably is formed by a continous zig-zag extending web of material, with one end thereof starting from a portion of the slide having an opening formed therein.

Openings in the sleeve and slide have a larger width dimension than height, and the openings in the sleeve preferably have a larger area than the opening in the slide.

The openings in the sleeve preferably are located at the long sides of the box, and upper marginal sides of the openings are formed with a sharp edge facing the void space of the box. The lower side of the opening in the slide suitably is formed with a sharp longitudinal edge preferably located centrally in the slide.

The open short side of the sleeve preferably is restricted by at least one protruding ridge extending in the longitudinal direction of the sleeve and there is a groove corresponding to said ridge on the slide between the head and the opening on at least one side of the slide. The inner ends of the ridges function as ledges.

DESCRIPTION OF A PREFERRED EMBODIMENT

Figure 1:
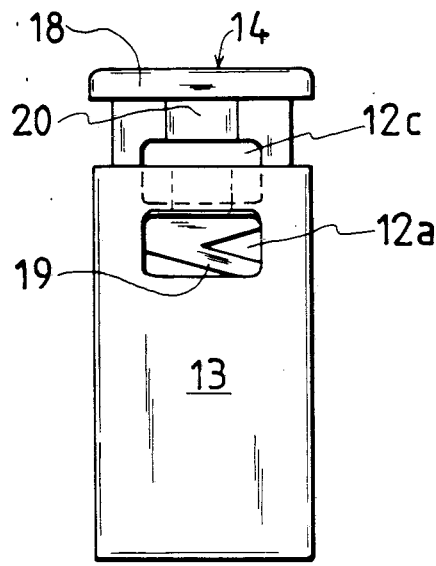
FIG. 1 is an elevation view of a locking device according to the invention, before the cord has been inserted.
Figure 2:
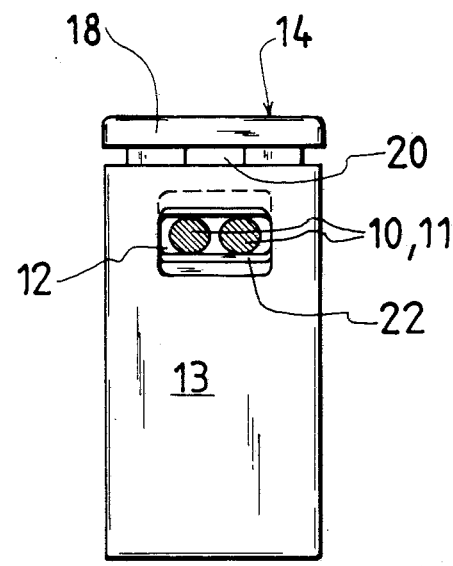
FIG. 2 shows the locking device having two cords inserted through the openings of the locking device.
Figure 3:
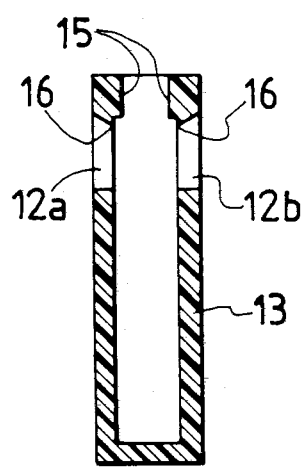
FIG. 3 is a vertical longitudinal cross section of the sleeve.
Figure 4:
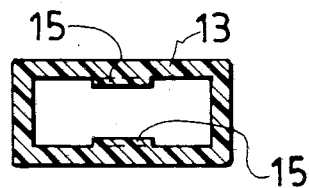
FIG. 4 is an end view of the open end of the sleeve drawn in cross section.
Figure 5:
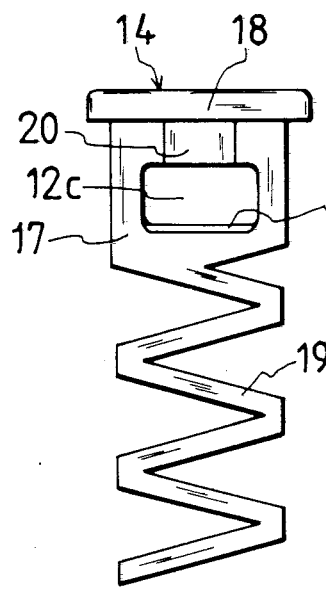
FIG. 5 shows the slide.
Figure 6:
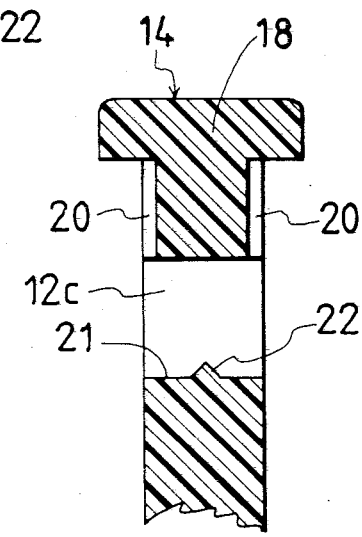
FIG. 6 is, at an enlarged scale, a longitudinal cross section through an upper portion of the slide.

The locking device shown in the drawing is intended for retaining two cord strands 10, 11, but the long and narrow opening 12 is also suitable for use with one or two cords.

The locking device consists of two parts, a sleeve 13 and a latching slide 14 insertable therein. Both parts preferably are manufactured from a plastic material, and as far as the slide is concerned, preferably a polyacetal.

The sleeve 13 is formed as a box which is open at one end or short side thereof. Two co-acting openings 12a, 12b are formed in the long side of the box, at some distance from the open short side or end. At at least one of the portions of the long sides which defines the opening of the void space of the sleeve there is a ridge 15 extending in the longitudinal direction of the sleeve, the inner end of which is a ledge.

The upper marginal edges of the openings 12a, 12b are obliquely cut and form a sharp edge 16 adjacent to the void space of the sleeve.

The latching slide 14 comprises a body 17 in which an opening 12c is formed in such a position that it is placeable in register with the openings 12a, 12b of the sleeve. Outwardly, the body 17 is terminated by a planar head 18. A spring 19 is formed integral with the body 17. Within a prismatic outer contour corresponding to the void space of the sleeve 13, the spring 19 is formed as a zig zag web of material.

A groove 20 placeable in register with the ridge 15 of the sleeve is formed in at least one side surface of the body 17. When the locking device is not mounted onto a cord end, the spring 19 pushes the slide outwards, the lower side 21 of the opening 12c in the slide will be caught by the ends of the ridges 15, the ledges thus preventing the slide from falling out of the sleeve. The grooves 20 provide for an easy sliding movement of the slide in spite of the protruding ridges or ledges.

The lower marginal wall 21 of the opening 12c is provided with a centrally placed, outwardly facing sharp edge 22.

In order to facilitate the insertion of a cord from either side of the sleeve, the openings 12a, 12b therein preferably are somewhat larger than the opening 12c in the slide. The opening 12c is placed such that it is in register with the openings in the sleeve when the head 18 has been brought into engagement with the upper edge of the sleeve, and in such a position the spring 19 is not fully compressed.

The illustrated embodiment is merely an example of the invention, the details of which may be varied in many ways within the scope of the accompanying claims. When used on a cord the locking device may act as a stop abutment, and the locking device may also be formed with a hook or a clamp for carrying an object from the cord.

I claim:

1. A locking device consisting of two pieces for a cord passing twice therethrough, comprising:

(a) hollow sleeve of synthetic resin having a rectangular cross-section with a rectangular bore open at one end, the length of said sleeve being considerably longer than the width of its cross-section, said sleeve having a pair of aligned rectangular openings near said one open end for enabling the cord to pass twice therethrough, said rectangular openings having a width larger than their height, and lying in the wider sides of said rectangular sleeve, the wider marginal edges of said sleeve openings being a sharp tapered edge directed away from said open end and disposed adjacent to the void space of said sleeve, said sleeve having at least one longitudinal ridge disposed within said open end and extending substantially to one of said openings and terminating in a ledge facing away from said open end; and (b) a movable slide of synthetic resin material having a portion slidably disposed in said bore of said sleeve, a rectangular head integral with said portion and having a planar dimension larger than said bore and defining a flange engageable with the end of said sleeve, and a spring integral with said slide portion, said portion, said head and said spring being continuously molecularly bonded, said spring being a continuous zigzag web of plastic disposed in said bore and biasing said slide toward said open end of said sleeve, said spring having a prismatic outer contour, said slide having an opening lying in a plane between and registerable with said rectangular sleeve openings when said flange is engaged, an edge of said slide opening comprising an abutment directed toward and engageable with said ledge on said sleeve to retain said slide in said sleeve when no core is present, said spring being only partially compressed when said ledge is engaged, and when said flange is engaged, a single sharp longitudinal edge adjacent to said abutment in said slide opening and disposed out of registration with said marginal edges of said sleeve-opening, and said slide having a groove for each said longitudinal ridge in which said ridge and said ledge is received, said groove extending from said head to said slide opening.

* * * * *